(12) United States Patent
van de Burgt et al.

(10) Patent No.: US 12,206,521 B2
(45) Date of Patent: Jan. 21, 2025

(54) APPARATUS FOR A CONTROLLER AREA NETWORK

(71) Applicant: NXP B.V., Eindhoven (NL)

(72) Inventors: Rolf van de Burgt, Laag Zuthem (NL); Bernd Uwe Gerhard Elend, Hamburg (DE); Thierry G. C. Walrant, Bouge (BE); Dennis aan de Stegge, Ede (NL)

(73) Assignee: NXP B.V., Eindhoven (NL)

(*) Notice: Subject to any disclaimer, the term of this patent is extended or adjusted under 35 U.S.C. 154(b) by 113 days.

(21) Appl. No.: 18/066,018

(22) Filed: Dec. 14, 2022

(65) Prior Publication Data

US 2023/0198799 A1    Jun. 22, 2023

(30) Foreign Application Priority Data

Dec. 17, 2021    (EP) .................................... 21215659

(51) Int. Cl.
*H04L 12/40*    (2006.01)
*H04B 1/38*    (2015.01)

(52) U.S. Cl.
CPC .............. *H04L 12/40* (2013.01); *H04B 1/38* (2013.01)

(58) Field of Classification Search
CPC .... H04B 1/38; H04B 1/40; H04L 7/00; H04L 7/0016; H04L 12/40; H04L 12/40013; H04L 12/40032; H04L 2012/4025
USPC ........ 375/219, 222, 257, 355, 360; 370/254, 370/257, 282, 506, 508, 509
See application file for complete search history.

(56) References Cited

U.S. PATENT DOCUMENTS

| | | | |
|---|---|---|---|
| 11,038,508 B2* | 6/2021 | de Haas | H03F 3/26 |
| 11,061,844 B2* | 7/2021 | de Haas | G06F 13/4027 |
| 11,520,600 B2* | 12/2022 | Muth | H04B 1/38 |
| 2012/0051241 A1* | 3/2012 | Mori | H04L 12/40039 |
| | | | 370/465 |
| 2018/0331852 A1 | 11/2018 | Kraly | |
| 2019/0385057 A1* | 12/2019 | Litichever | H04L 63/14 |
| 2021/0044600 A1* | 2/2021 | Elend | H04L 1/0061 |
| 2021/0226661 A1* | 7/2021 | de Haas | H04B 1/40 |
| 2021/0400056 A1 | 12/2021 | Klosters et al. | |
| 2022/0070022 A1 | 3/2022 | van de Burgt et al. | |
| 2022/0376947 A1* | 11/2022 | Antonsson | H04L 12/40 |

FOREIGN PATENT DOCUMENTS

| | | |
|---|---|---|
| EP | 2985955 A1 | 2/2016 |
| EP | 3691198 A1 | 8/2020 |

* cited by examiner

*Primary Examiner* — Young T. Tse (57) ABSTRACT

An apparatus for a CAN transceiver configured to couple to a CAN bus and generate receive-data based on signals therefrom and generate signals on the CAN bus in response to transmit-data received from a CAN controller, wherein the apparatus is configured to: receive the receive-data comprising a plurality of bits; and for each of one or more bits of the receive-data, sample at a respective sample time to determine a respective value of each of the one or more bits; and with an edge detector determine, during a respective edge detector window, the occurrence of an edge in the receive-data and generate metadata indicative thereof, wherein the edge detector window comprises a period of time that includes the sample time; and wherein the apparatus is configured to determine whether transmit-data is compliant with one or more rules based on the respective values and the metadata.

19 Claims, 4 Drawing Sheets

APPARATUS FOR A CONTROLLER AREA NETWORK

CROSS-REFERENCE TO RELATED APPLICATIONS

This application claims the priority under 35 U.S.C. § 119 of European patent application no. 21215659.0, filed Dec. 17, 2021, the contents of which are incorporated by reference herein.

FIELD

The present disclosure relates to an apparatus for a controller area network (CAN) transceiver. It also relates to a CAN transceiver, and a CAN node comprising a CAN controller and a CAN transceiver. It also relates to a method for a CAN transceiver.

BACKGROUND

In-vehicle network (IVN) buses, such as CAN (Controller Area Network), CAN FD (CAN with Flexible Data-Rate), LIN (Local Interconnect Network), FlexRay, Ethernet based network buses, and other types, can be used for communications within vehicles. For example, controller area network (CAN) bus is a message-based communications bus protocol that is often used within automobiles. It will be appreciated that CAN networks also have application outside of the field of automobiles. A CAN bus network may include multiple bus devices, so called nodes or electronic control units (ECUs), such as an engine control module (ECM), a power train control module (PCM), airbags, antilock brakes, cruise control, electric power steering, audio systems, windows, doors, mirror adjustment, battery and recharging systems for hybrid/electric cars, and many more. The CAN bus protocol is used to enable communications between the various bus devices. The data link layer of the CAN protocol is standardized as International Standards Organization (ISO) 11898-1:2003. CAN Flexible Data-Rate or "CAN FD," which is an extension of the standardized CAN data link layer protocol and is meanwhile integrated into the ISO11898-1:2015 standard, can provide higher data rates. The standardized CAN data link layer protocol is being further extended to provide even higher data rates. A further extension, referred to as CAN XL, with a new level scheme allowing even higher data rates is in the definition phase discussed under CiA610 (CAN in Automation) and is moving towards standardization in the form of either a further update of the existing ISO11898 standards or a new standard.

SUMMARY

According to a first aspect of the present disclosure there is provided an apparatus for a CAN transceiver, the CAN transceiver configured to couple to a CAN bus and generate receive-data based on one or more signals received from the CAN bus and configured to generate one or more signals on the CAN bus in response to transmit-data received from a CAN controller, wherein the apparatus is configured to:
receive the receive-data, the receive-data comprising a plurality of bits; and
for each of one or more bits of the plurality of bits of the receive-data, sample the receive-data at a respective sample time to determine a respective value of each of the one or more bits in the receive-data; and
wherein the apparatus comprises an edge detector configured to determine, during a respective edge detector window, the occurrence or non-occurrence of an edge in the receive-data and generate metadata that is indicative of an edge having occurred or not-occurred during the respective edge detector window and wherein the edge detector window comprises a period of time, in each of the one or more of the plurality of bits, that extends from a first time to a second time and that includes the sample time; and wherein the apparatus is configured to:
receive the transmit-data;
determine whether or not the transmit-data is compliant with one or more rules based on the respective values of each of the one or more bits and the metadata.

In one or more embodiments, the period of time that defines the edge detector window is predetermined.

In one or more embodiments, the period of time that defines the edge detector window is configured to end prior to an end of the respective bit of the one or more bits.

In one or more embodiments, the apparatus is provided as part of the CAN transceiver for coupling with the CAN controller.

In one or more embodiments, the first time and the second time that define the period of time of the edge detector window is based on a clock drift parameter, the clock drift parameter defining the accuracy of a clock of the one or more of CAN controller and the apparatus.

In one or more embodiments, the period of time that defines the edge detector window is up to 30%, 40%, 50%, 60% or 70% of the duration of the bits in the receive-data.

In one or more embodiments, the period of time that defines the edge detector window is variable and dependent on a position in a CAN frame in the receive-data.

In one or more embodiments, the first time is prior to the sample time and the second time is after the sample time.

In one or more embodiments, based on a determination that the transmit-data is not compliant, the apparatus is configured to prevent transmission by said CAN transceiver of said signalling that represents said transmit-data by one or more of:
modification of the transmit-data;
blocking of the transmit-data from receipt by a transmitter module of the CAN transceiver, the transmitter module configured to translate the transmit-data into differential voltage levels for transmission on the CAN bus; and
blocking of the output of the transmitter module of the CAN transceiver, the transmitter module configured to translate the transmit-data into differential voltage levels and output said differential voltage levels to the CAN bus.

In one or more embodiments, said apparatus is configured to detect errors in the receive-data, and wherein said one or more rules include the detection of an error frame in the transmit-data only at times that correspond to when the apparatus detects an error is present in the receive-data.

In one or more embodiments, the apparatus is configured to determine that the error is present in the receive-data if one or more of the following receive-data rules is contravened:
a stuff error rule, the stuff error rule defining adherence to a stuffing rule for the CAN protocol;
a cyclic redundancy check (CRC) error rule, the CRC error rule defining that the CRC field indicates that the data in the data field is correct;

a form error rule, the form error rule defining one or more expected values of predetermined bits in a CAN frame according to the CAN protocol; and a bit error rule, the bit error rule defining that bits in the transmit-data should be seen in the receive-data.

In one or more embodiments, the apparatus is configured such that the determination of the transmit-data being non-compliant with the one or more rules is less likely when the metadata is indicative of the occurrence of an edge in the edge detector window for one or more recent bits of the one or more bits than when the metadata is indicative of the non-occurrence of an edge in the edge detector window for the one or more recent bits of the one or more bits.

In one or more embodiments, the apparatus is configured to, based on:
  i) detection of an error frame, in the transmit-data, sent by the CAN controller;
  ii) determination that an error has occurred in the receive-data; and
  iii) the metadata does not indicate the occurrence of an edge associated with said one or more bits;
determine that the error frame was validly generated.

In one or more embodiments, the apparatus is configured to, based on:
  i) detection of an error frame, in the transmit-data, sent by the CAN controller;
  ii) determination that an error has not occurred in the receive-data; and
  iii) the metadata does indicate the occurrence of one or more edges associated with the one or more bits;
determine that the error frame was validly generated.

In one or more embodiments, the apparatus is configured to modify the receive-data that is to be sent to the CAN controller, wherein the apparatus is configured to latch the value of a respective bit, as represented in the receive-data, during the respective edge detector window, such that the value of the bit is held constant during the respective edge detector window.

In one or more examples, the respective sample time is based on predetermined network information defining the sample time relative to each bit in the receive-data for nodes coupled to the CAN bus.

According to a second aspect of the disclosure, we provide a method for a CAN transceiver, the CAN transceiver configured to couple to a CAN bus and generate receive-data based on one or more signals received from the CAN bus and configured to generate one or more signals on the CAN bus in response to transmit-data received from a CAN controller, wherein the method comprises:
  receiving the receive-data, the receive-data comprising a plurality of bits; and
  for each of one or more bits of the plurality of bits of the receive-data, sampling the receive-data at a respective sample time to determine a respective value of each of the one or more bits in the receive-data; and
  determining by an edge detector, during a respective edge detector window, the occurrence or non-occurrence of an edge in the receive-data and generate metadata that is indicative of an edge having occurred or not-occurred during the respective edge detector window and wherein the edge detector window comprises a period of time, in each of the one or more of the plurality of bits, that extends from a first time to a second time and that includes the sample time;
  receiving the transmit-data; and
  determining whether or not the transmit-data is compliant with one or more rules based on the respective values of each of the one or more bits and the metadata.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

BRIEF DESCRIPTION OF THE DRAWINGS

One or more embodiments will now be described by way of example only with reference to the accompanying drawings in which.

DETAILED DESCRIPTION

Figure 1:
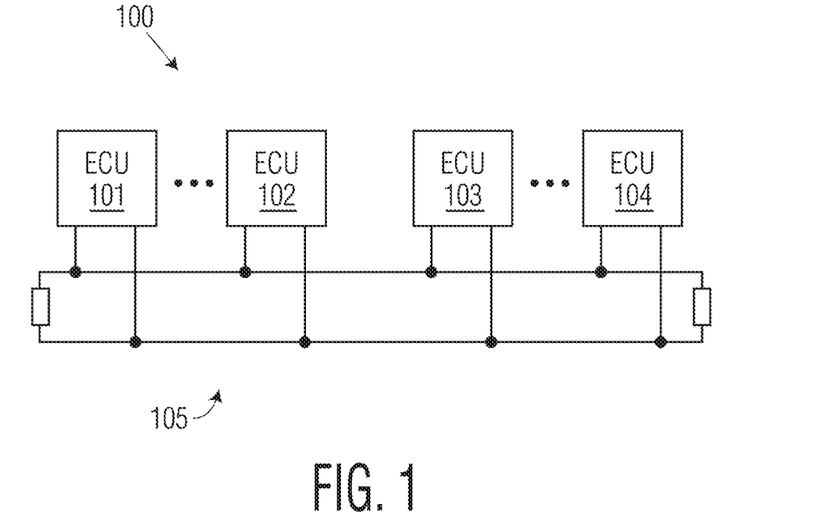
FIG. 1 shows an example embodiment of a plurality of CAN nodes connected to a common CAN bus.

Example FIG. 1 shows a CAN bus system 100 with a plurality of nodes or ECUs (Electronic Control Units) 101-104 connected to the same CAN bus wires 105 comprising a first CANH wire and a second CANL wire. The nodes 101-104 may comprise nodes that implement Classical CAN, CAN FD nodes that implement the CAN FD protocol or CAN XL nodes that implement the new CAN XL protocol.

Figure 2:
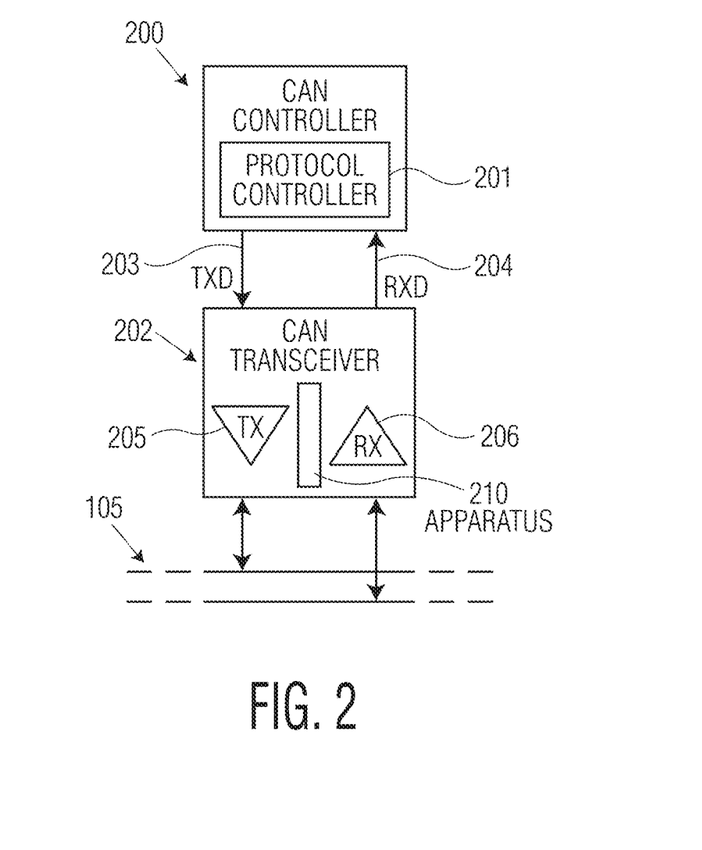
FIG. 2 shows an example CAN node comprising a CAN controller coupled with a CAN transceiver and including an apparatus, the CAN transceiver providing the coupling to the CAN bus.

Example FIG. 2 shows one of the nodes 101-104 in more detail. A node mainly comprises a CAN controller 200, such as a microcontroller, that implements the CAN, CAN FD or CAN XL protocol such as by using an embedded CAN, CAN FD or CAN XL protocol controller 201. The CAN controller 200 may be known as a host. The controller 200 and, more particularly, the protocol controller 201 is connected to the CAN bus 105 by a CAN transceiver 202. The CAN controller 200 is connected to the CAN transceiver 202 through two interface connections called TXD (Transmit Data) 203 and RXD (Receive Data) 204. The controller may therefore have a transmit output terminal that couples with a transmit input terminal of the CAN transceiver 202. Likewise, the CAN transceiver 202 may have a receive output terminal that couples with a receive input terminal of the CAN controller 200. The transceiver 202 is used to convert transmit-data, comprising a digital bit stream on TXD 203, into analogue signalling on the bus wires 105 using a transmitter module 205. The transceiver 202 is also used to convert analogue signalling from the bus 105 into receive-data comprising a digital output signal or bit stream by a receiver module 206 for providing to the RXD connection 204. The transmitter module 205 is thus configured to convert the transmit-data into dominant bit and recessive bit differential signals for the bus 105. The receiver module 206 is thus configured to receive the differential signals from the bus 105 and determine the presence of either a dominant bit or a recessive bit and generate the receive-data based thereon. In general, the CAN transceiver comprises an interface device to the network and the CAN controller comprises a controller that is configured to transmit data to and receive data from the network via the interface device.

In one or more examples, and for context, if node 103 is transmitting a CAN frame, the receiving nodes 101, 102 and 104, are, according to the CAN protocol, configured to verify the received frame and may acknowledge the frame or invalidate the frame with an error frame. The error frame can be transmitted during the frame or in an End Of Frame (EOF) field. If there is an error frame transmitted on the bus, all receiving nodes 101, 102, 104 will discard the frame they just received and the transmitting node 103 will optionally retry to transmit the frame for a number of times. With this property each node has a veto with which it can invalidate a frame on the bus 105.

The CAN protocol includes different types of errors that may cause a CAN controller to transmit an error frame. The error frames that may be transmitted during a CAN frame, and prior to a CRC delimiter field, are a result of bit errors, form errors and/or stuff errors. A bit error is detected by transmitting nodes if they do not receive back in the receive-data what they have transmitted in the transmit-data. A form error is detected if a predefined bit of the CAN frame does have the correct value according to the CAN protocol. A stuff error is detected when the CAN stuffing rule is not obeyed and too many bits with the same value are transmitted consecutively, which is in most cases no more than five bits.

CAN transceivers may be configured to be protocol aware, meaning that they can identify one or more parts of a CAN frame and provide functions in response to one or more parts of the CAN frame received from the signalling from the bus 105. The CAN transceiver may be equipped with a CAN ISO11898 compliant receiver that is capable of decoding frames on the bus. The CAN transceiver may include clock recovery functionality to synchronize with the timing of CAN frames in the receive-data and/or the transmit-data.

In one or more examples, the protocol aware part of the CAN transceiver is observing the CAN frames and bits therein on the bus 105 from a different location from the CAN protocol controller 201 in the CAN transceiver.

Accordingly, due to the point where the protocol aware transceiver is observing the bus, the protocol aware transceiver 202 may not sample the same value from the bus 105 as the CAN protocol controller 201 of the local host, even if the sample point configuration is identical. It may be that the CAN protocol controller 201 is sampling slightly earlier and, if a dominant bit is stretched more than the allowed arbitration delay, it can occur that the local host will sample a dominant bit while the protocol aware transceiver samples a recessive bit. Further, if the bit sampled dominant by the CAN protocol controller 201 is, for example, the sixth dominant bit in a row, the CAN protocol controller 201 will detect a stuff error and then generate an error frame. The protocol aware transceiver did not detect a stuff error and will determine that the stuff error frame from the CAN protocol controller as illegally generated, but from the point of view of the CAN protocol controller it was validly generated.

We disclose an example apparatus 210 that may, in one or more examples, be configured to evaluate the signalling on the bus 105 to determine signalling metadata. With this signalling metadata, the apparatus may be configured to determine whether the actions of the CAN protocol controller, such as the generation of one or more error frames or error signals, are legal or illegal wherein the metadata may be used to account for the apparatus 210 sampling the receive data from the CAN bus from within or near the CAN transceiver 202 while the CAN protocol controller 201 is sampling the receive data from the CAN bus from within the CAN controller 200. An error frame may be of the form defined in the CAN protocol. An error frame may comprise a frame as defined by ISO11898-1. An error signal can be any signal provided to the bus that corrupts the current frame.

If a node has a CAN controller or associated host with a defect or compromised software, it can occur that the node will try to invalidate CAN frames that are received correctly and that should have been acknowledged according to the CAN protocol. A compromised CAN controller or host may abuse the error management of the CAN standard to perform a denial of service attack by invalidating all frames on the bus or mute one of the other nodes by selectively invalidating frames with certain IDs or CAN frame formats. For safety and security reasons this is unwanted behaviour. Thus, in one or more examples, providing an apparatus 210 that may identify illegal behaviour of the CAN controller more effectively, such as with fewer false positives, may be advantageous.

Thus, in one or more example embodiments of the disclosure, the CAN transceiver 202 may additionally include an apparatus 210 configured to receive the receive-data, the receive-data comprising a plurality of bits. The apparatus may be configured to receive the transmit-data.

The apparatus 210 may be configured to, for each of one or more bits of the plurality of bits of the receive-data, sample the receive-data at a respective sample time to determine a respective value of each of the one or more bits in the receive-data. The sample time may be defined at a network level such that each node 101-104 coupled to the CAN bus network samples the signalling from the CAN bus at a substantially equivalent time during each bit. It will be known to those skilled in the art that this sampling time may be set at, for example, 80% (or other percentage) through a bit time such that any ringing that may occur has time to settle before the value of the bit is sampled. However, the precise time that the sample time occurs depends at least on clock drift of a clock in each node or each CAN controller that is used to determine the sample time.

The apparatus 210 comprises an edge detector (not shown in FIG. 2). The edge detector is configured to detect edges, that is transitions between values of the bits, in the receive-data. In one or more examples, the edge detector is configured to determine, during a respective edge detector window, the occurrence and/or non-occurrence of an edge in the receive-data. The edge detector, such as in combination with the apparatus, may be configured to generate metadata that is indicative of an edge having occurred and/or not-occurred during the respective edge detector window. The edge detector window comprises a period of time, in each of the one or more of the plurality of bits, that extends from a first time to a second time and that includes the sample time. The edge detector window will be described in more detail with reference to FIG. 5 below.

Further, in one or more examples, the apparatus 210 is configured to determine whether or not the transmit-data is compliant with one or more rules based on the respective values of each of the one or more bits and the metadata. Thus, because the metadata is used as part of the assessment of the transmit data, decisions made by the apparatus 210 on whether the transmit-data is compliant may be improved in one or more examples. If the apparatus 210 determines that the transmit-data is non-compliant, even when accounting for the metadata, then a control action may be taken.

In one or more examples, the apparatus 205 may be configured to block or allow the transmit-data received on TXD 203 from being received by the transmitter module 205 of the CAN transceiver 202. In one or more examples, the apparatus may be configured to use the metadata to determine whether to take action or not take the control action in limiting access to the CAN bus 105 for the CAN controller 200.

The determination of compliance with the one or more rules by the apparatus may include determining whether one or more CAN frames present in the transmit-data and that represent reactions of the CAN controller to the state of the bus have been generated correctly.

The apparatus 210 may thus be CAN protocol aware (e.g. to an extent necessary), meaning that it can identify one or more parts of a CAN frame and provide its control in response to one or more parts of the CAN frame being transmitted and/or present in the signalling on the bus 105. The apparatus 210 may include a CAN ISO11898 compliant receiver that is capable of decoding frames from the bus 105, such as in the receive-data from the receiver module 206. However, it will be appreciated that the apparatus 210 may not require all the functionality provided in ISO11898 and may, instead, be configured to decode CAN frames according to one or more predetermined decoding rules, which may be derived from or comprise a subset of the rules defined in ISO11898 for a CAN receiver.

In one or more examples, the apparatus 210 may be configured to detect errors in the receive-data. The apparatus 210 will therefore know whether an error frame generated by the CAN controller and present in the transmit-data was generated at an appropriate time. Thus, the one or more rules used by the apparatus 210 to determine compliance may include the detection of an error frame in the transmit-data only at times the apparatus 210 detects an error is present in the receive-data.

It will be appreciated that the apparatus 210 may be configured to determine one or more of the potential errors according to the CAN protocol. For example, the apparatus may be configured to determine that at error is present in the receive-data if one or more of the following receive-data rules is contravened:
  a stuff error rule, the stuff error rule defining adherence to a stuffing rule for the CAN protocol;
  a CRC error rule, the CRC error rule defining that the CRC field indicates that the data in the data field is correct;
  a form error rule, the form error rule defining one or more expected values of predetermined bits in a CAN frame according to the CAN protocol; and
  a bit error rule, the bit error rule defining that bits in the transmit-data should be seen in the receive-data.

Figure 3:
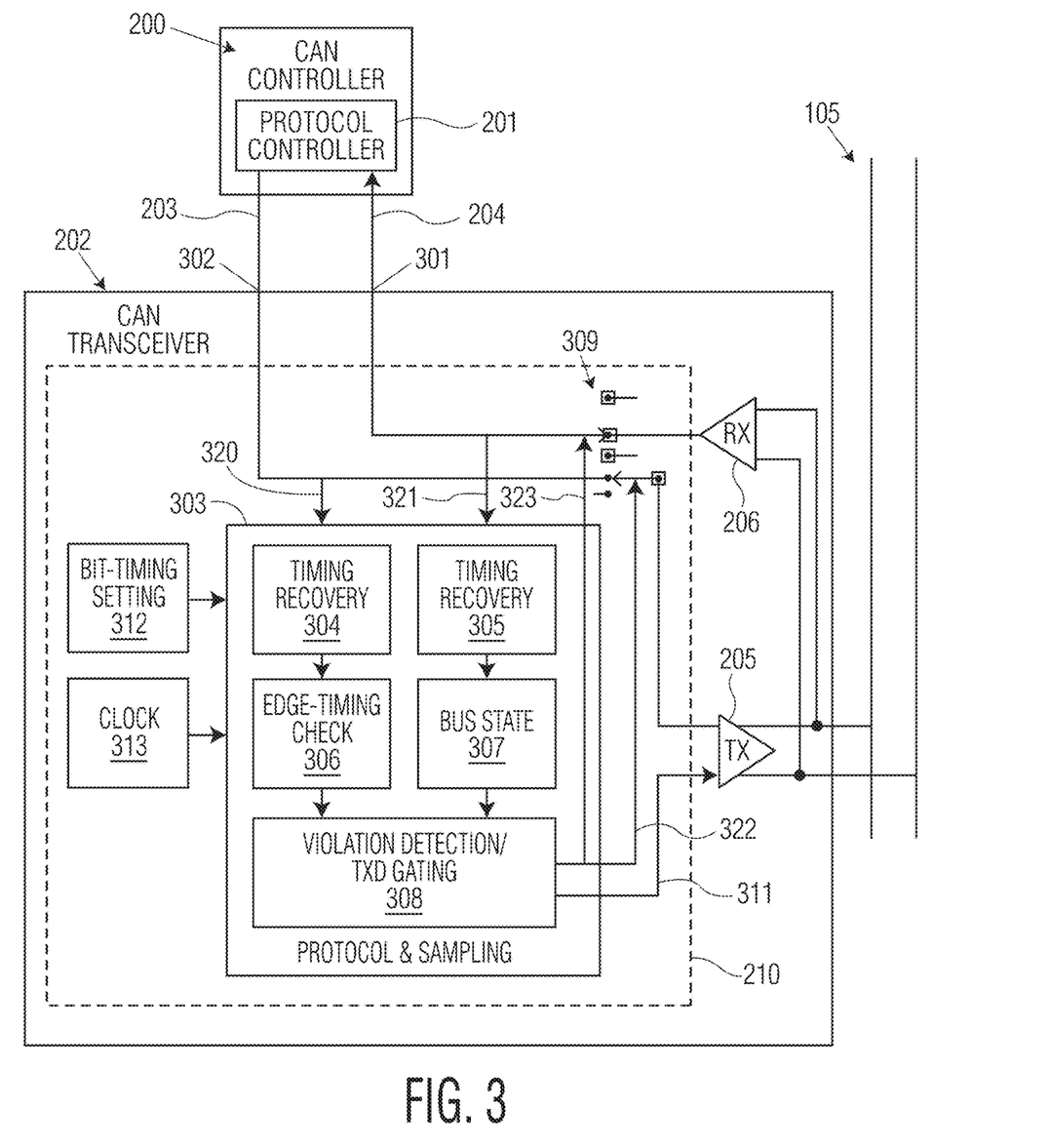
FIG. 3 shows an example embodiment of the apparatus, which in this example, is part of the CAN transceiver.

A more detailed view of the apparatus 210 is provided in FIG. 3. FIG. 3 shows an example of the functional parts the apparatus 210 may require. The same reference numerals as used in FIG. 2 are also used in FIG. 3 for like parts.

In summary, the apparatus 210 is for a CAN transceiver. In FIG. 3, the apparatus 210 is shown as part of the CAN transceiver 202 and as an interface between the combination of the receiver module 206 and the transmitter module 205 and the receive output terminal 301 and the transmit input terminal 302. In other examples, the apparatus 210 may be external to the CAN transceiver 202, and couple to the receive output terminal 301 and the transmit input terminal 302. In such a configuration, the transmit-data from the CAN controller 200 may pass through the apparatus 210 to the transmit input terminal 302 and the receive-data received from the receive output terminal 301 may be passed to the CAN controller through the apparatus 210.

In whichever configuration, the apparatus 210 may comprise a first input 320 for receiving transmit-data generated by a CAN controller 200. The transmit-data, as will be familiar to those skilled in the art, causes the CAN transceiver 202 to transmit signalling that represents said transmit-data on the CAN bus, such as by way of the transmitter module 205. Further, the apparatus 210 may comprise a second input 321 for receiving receive-data, wherein the receive-data is indicative of signalling from the CAN bus 105, which may be received from the receiver module 206.

The apparatus 210 comprises protocol-and-sampling block 303 configured to read the CAN frames and signalling in the transmit-data and the receive-data. To provide such functionality and subsequent control, the protocol-and-sampling block 303 includes a first timing recovery block 304 for determining the signal timing in the transmit-data. Further, the protocol-and-sampling block 303 includes a second timing recovery block 305 for determining the signal timing in the receive-data. An edge-timing-check block 306 is configured to receive the transmit data and check the timing of the edges, that is transitions between dominant and recessive bits, in the transmit-data for errors or compliance with the CAN protocol. A bus-state block 307 is configured to determine the state of the bus from the receive data. Accordingly the bus-state block may be configured to determine one or more of the type of CAN frame being received, the part of the frame being received and whether the bus 105 is in use or not. A violation-detector-and-TXD-gating block 308 is configured to provide for detection of the violation of one or more predetermined rules in the transmit data. The violation of the one or more predetermined rules may be determined based on the content of the transmit-data and the current state of the bus 105, determined from the receive-data.

In general and in one or more examples, the apparatus 210 comprises one or more clock recovery modules to determine the bit timing in the receive-data and/or the transmit-data and is configured to follow the CAN protocol and to determine if the bit timing that is observed is in accordance with one or more bit timing rules (which may be or be based on bit timing rules of the CAN protocol). The apparatus may thereby be able to detect the presence or absence of errors in a received CAN frame from the CAN bus 105 and therefore determine whether or not a reaction of the CAN controller 200 is appropriate.

The protocol-and-sampling block 303 may be configured to receive one or more reference signals to provide these functions. Thus, a bit-timing-settings block 312 is configured to store the bit timing settings for the CAN network, as will be familiar to those skilled in the art. A clock 313 provides a clock signal.

The violation-detector-and-TXD-gating block 308, or more generally the apparatus 210, may be configured to perform one or more control actions.

In one or more examples, a first control action may be to isolate or block the transmit-data from reaching the receiver module 205 or the bus 105. In this example, the violation-detector-and-TXD-gating block 308 or more generally the apparatus may be configured to manipulate the transmit data that is provided to the transmitter module 205 by way of one or more signals provided at a first output 322. The signals from the first output 322 may control switch 310. Switch 310 may interrupt the connection between the transmit input terminal 302 and the transmit module 205. In other examples, the signal 322 may be configured to insert or change bits in the transmit-data. Thus, if the apparatus determines that the transmit-data is not compliant, the apparatus 210 may prevent transmission by said CAN transceiver of said signalling that represents said transmit-data by one or more of: modification of the transmit-data; blocking of the transmit-data from receipt by a transmitter module of the CAN transceiver, the transmitter module configured to translate the transmit-data into differential voltage levels for transmission on the CAN bus; and blocking of the output of the transmitter module of the CAN transceiver, the transmitter module configured to translate the transmit-data into differential voltage levels and output said differential voltage levels to the CAN bus.

In one or more examples, a second control action may be to provide for transmission of dominant bits on the bus to invalidate the frame. In this example and one or more other examples, the violation-detector-and-TXD-gating block 308 or, more generally, the apparatus, may be configured to send error frames by providing appropriate signals to the transmit module 205 from a second output 311. This control action may be used if the apparatus is configured to detect errors in the receive-data independent of the CAN controller.

In one or more examples, a third control action may be to modify the receive-data that is passed to the CAN controller 200. In this example, the violation-detector-and-TXD-gating block 308 or, more generally, the apparatus, may be configured to manipulate the receive-data that is provided to the CAN controller 200 by one or more signals provided at a third output 323. The signals from third output 323 may control switch 309. Switch 309 may interrupt the connection between the receive module 206 and the receive output terminal 301. In other examples, the signals at third output 323 may be configured to insert or change bits in the receive data.

In one or more examples, a fourth control action may be to do nothing because the metadata is indicative of an edge having been detected. This may mean that there is a chance that any suspicious behaviour of the CAN controller can be explained by the possibility that it sampled a different value in the receive data from that sampled by the apparatus 210.

It will be appreciated that FIG. 3 provides one example of an implementation of the apparatus 210. In other implementations, the functions of the apparatus 210 described herein may be provided by a general purpose processor with appropriately configured software or a FPGA or a PLC or a dedicated die. Accordingly, in the description that follows, the functionality will be described as being provided by the apparatus 210 in general rather than by one or more of the blocks, such as block 308.

Figure 4:
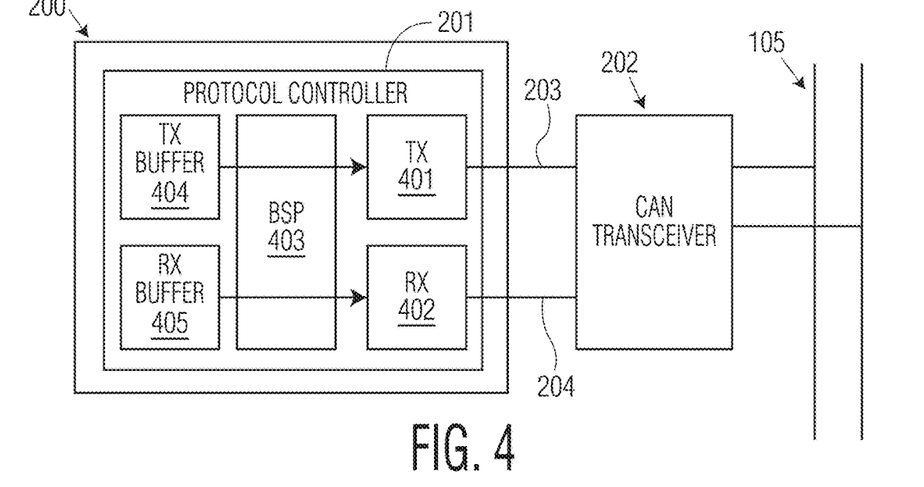
FIG. 4 shows an example architecture of a protocol engine of the CAN controller.

To provide further context, and with reference to FIG. 4, we can consider a possible architecture for a protocol engine of the CAN protocol controller 201 in the CAN controller 200. The protocol engine typically comprises a transmit part 401 and a receive part 402 with a common Bit Stream Processor (BSP) 403 and frame buffers. Thus, data generated for transmission is passed from the transmit buffer 404, to the BSP 403 and into the transmit part 401 before being sent on TXD 203. Further, receive-data from RXD 204 is received into the receive part 402, is passed to the BSP 403 and then to the receive buffer 405. The transmit part 401 and the receive part 402 can have different notions of time. If the protocol engine has nothing to transmit and is only listening on the bus, the receive part is synchronizing to the timing of the signalling on the bus 105, received via the CAN transceiver 202. Sampling of the receive-data will be done with that recovered timing and will define a sampling time. If the protocol engine is also transmitting or participating in arbitration, it may be configured to sample the receive-data from the CAN transceiver 202 with a sample pulse based on time that is synchronized with the timing used to generate the transmit-data. This sample time will likely be ahead of the sample time in the receive path, as the delay introduced by the CAN transceiver 202 may not be accounted for.

Thus, if we consider possible differences between the timing used by the protocol engine of the CAN protocol controller 201 and the timing used by a protocol aware CAN transceiver, the CAN transceiver will be synchronizing on the data received from the bus, but may be slightly ahead of the receive part in the CAN protocol controller 201, as it does not have the input-output delay between CAN transceiver 202 and the CAN controller 200 included. Further, the CAN protocol controller 201 and the protocol aware CAN transceiver may use independent clock sources, which have their own accuracy tolerances, which could also cause differences in timing between the protocol aware transceiver and the CAN controller 200.

The apparatus 210, in one or more examples, may be configured to mitigate against the sampling of different values in the receive-data. The apparatus 210, in one or more examples, may then be able to reliably determine suspicious or erroneous behaviour of the CAN controller 200 rather than reach a false positive conclusion caused by the described timing discrepancies.

Figure 5:
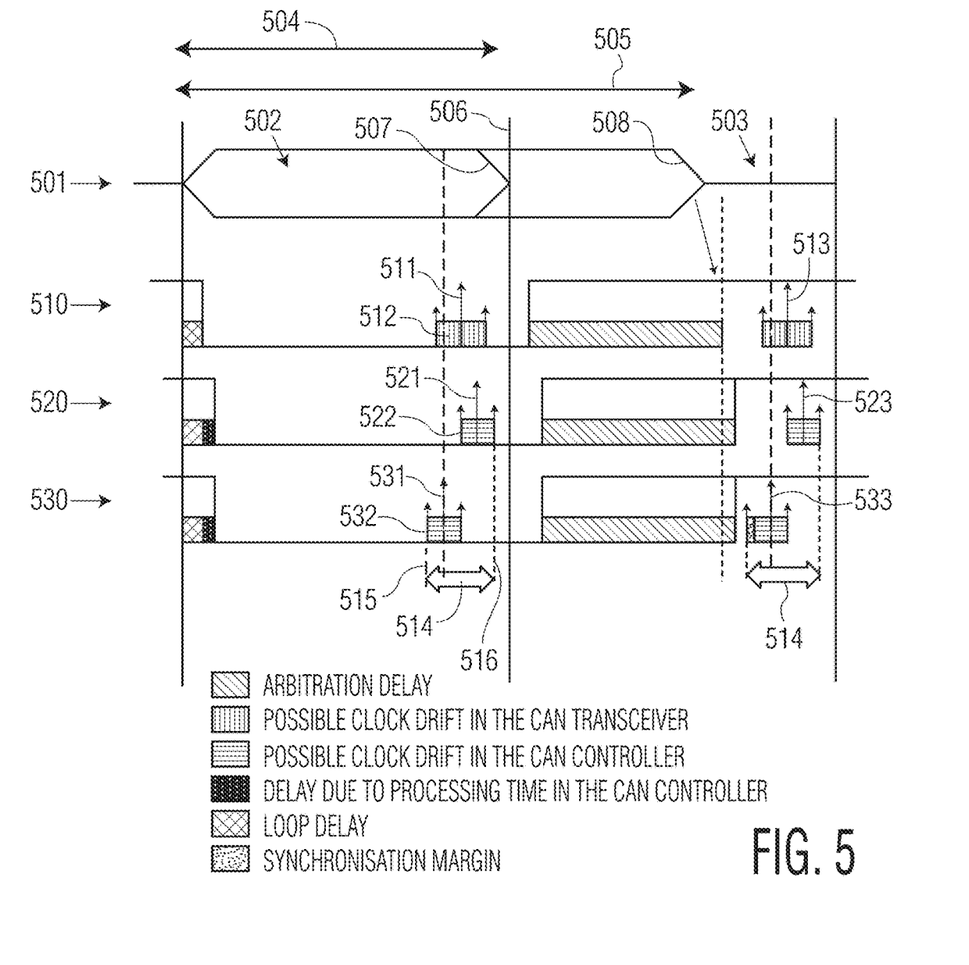
FIG. 5 shows an example timing diagram.

Example FIG. 5 shows a representation of the receive-data 501 comprising a plurality of bits. A first bit 502 is shown in FIG. 5 followed by a second bit 503. Each bit is provided over a nominal bit time 504 defined by the protocol. However, due to delays on the bus, such caused by an arbitration delay, the first bit 502 may or may not be stretched over a longer bit time 505.

A first timing diagram 510 shows the sampling of the bits of the receive-data 501 by the apparatus 210.

A second timing diagram 520 shows the sampling of the bits of the receive-data 501 by the CAN controller 200 when using a clock reference that is configured to be synchronized with the receive-data.

A third timing diagram 530 shows the sampling of the bits of the receive-data 501 by the CAN controller 200 when using a clock reference that is configured to be synchronized with the transmit-data generated by the CAN controller 200.

With reference to the second timing diagram 520, the CAN controller 200 is shown to sample the receive-data at a sample time 521. The sample time 521 may however occur at any time within a sampling window 522 due to clock drift.

With reference to the third timing diagram 530, the CAN controller 200 is shown to sample the receive-data at a sample time 531 earlier than the sample time 521. The sample time 531 may however occur at any time within a sampling window 532 due to clock drift.

With reference to the first timing diagram 510, the apparatus 210 is configured to receive each of the one or more bits 502, 503 of the plurality of bits of the receive-data, and sample the receive-data 501 at a respective sample time 511 (and subsequently sample time 513). The sample time 511 may however occur at any time within a sampling window 512 due to clock drift of the clock of the apparatus 210. Sampling at sample point 511 will determine a respective value of the first bit 502 of dominant or logic 0.

However, a change in the value of the bits 502, 503 may occur at the end of the nominal bit time 504 at time point 506 or at some point after considering the possible arbitration delay. Thus, with the sampling window 522 very close to the time point 506, the CAN controller may sample a different value at the nominal bit time 504 because the receive-data may transition from the first bit 502 to the second bit 503 at any time between 506 and the end of the period 505. Similarly, when sampling the next bit 503, the first bit 502 may have been stretched, by the arbitration delay, over the time 505 and therefore the sample time 513, 523, 533 may occur close to the change in bit value at time 508.

FIG. 5 shows the edge detector window 514 in which the edge detector (such as embodied as edge-timing-check block 306) is configured to determine the occurrence or non-occurrence of an edge 507 in the receive-data 501. The edge detector window 514 comprises a period of time for each sample time 511 that extends from a first time 515, prior to the sample time, to a second time 516, after the sample time, and therefore the window includes the sample time 511.

The size of the period of time of the edge detector window 514 may be configured to encompass a maximum clock drift that may occur in one or more clocks used by the CAN controller 200 to determine the sample time 521 and/or sample time 531. Thus, in this example, the edge detector window 514 is configured to extend from a time of a lower bound of the sample window 532 to a time of an upper bound of the sample window 522.

In one or more examples, the edge detector window 514 is configured to end before an earliest possible edge of a subsequent bit, i.e. before time 506 in this example.

As mentioned above, the edge detector is configured to generate metadata that is indicative of an edge having occurred or not-occurred during the respective edge detector window 514. Thus, the metadata and, in particular, the metadata when it indicates that an edge occurred near (defined by the window 514) a respective sample time 511 may be indicative of a risk that the CAN controller 200 has sampled the receive-data and determined a different bit value to that of the apparatus 210.

In one or more examples, the apparatus 210 may be configured to perform a control action to ensure that the sampling of the bit by the CAN controller 200 is consistent with the sampling of the bit by the apparatus. Thus, in one or more examples, the apparatus 210 may be configured to modify the receive-data that is to be sent to the CAN controller, wherein the apparatus is configured to latch the value of a respective bit during the respective edge detector window, such that the value of the bit is held constant during the respective edge detector window. This ensures that the CAN controller 200 samples the same value of the bit as that sampled by the apparatus 210. This latching during the edge detector window time may be performed only in certain predetermined bit fields of the CAN frame. For example, for one or more selected bits outside the arbitration field. The one or more selected bits may exclude stuff bits.

According to the protocol and in a clean environment (e.g. with no delays or timing errors), no edges should occur in this edge detector window 514. However, due to disturbances and noise, it can occur that there is an edge on the bus. The metadata from the edge detector therefore informs the apparatus 210 on the possibility of the CAN controller generating an error frame that, from the point of view of the CAN controller 200 has of the receive-data was validly generated, but from the point of view of the apparatus 210 was not.

In this example, the period of time that defines the edge detector window may be predetermined. In some examples, a measure of the clock drift of the CAN controller may be taken (i.e. a so called clock drift parameter defining the accuracy of a clock or susceptibility to drift) during a calibration phase and used to determine the duration of the edge detector window. In other examples the period of time that defines the edge detector window may be fixed, such as up to 50%, 40%, 30%, 20% or 10% of the duration of the bits in the receive-data. The edge detector window may be substantially symmetrical about the sample time 511. The size of the edge detector window may be application specific and set during a configuration phase. For example, it may be set at any value up to 30% (or other limit) of the bit time. The period of time of the edge detector window may vary through a CAN frame. For example, it may comprise a first, longer length during arbitration and a shorter length at other times. In other examples, where CAN FD and CAN XL is used, the edge detector window is shorter to correspond to the shorter bit time. In general, the edge detector window may be less than the shortest bit time of the bits currently present in the receive-data.

Thus, the apparatus 210 may be configured to, based on:
i) detection of an error frame, in the transmit-data, sent by the CAN controller;
ii) determination that an error has occurred in the receive-data based on the sampled respective values of each of the one or more bits in the receive-data and predetermined protocol rules; and
iii) the metadata does not indicate the occurrence of an edge associated with said one or more bits;
determine that the error frame was validly generated.

Further, the apparatus 210 may be configured to, based on:
i) detection of an error frame, in the transmit-data, sent by the CAN controller;
ii) determination that an error has not occurred in the receive-data based on the sampled respective values of each of the one or more bits in the receive-data and predetermined protocol rules; and
iii) the metadata does indicate the occurrence of one or more edges associated with the one or more bits;
determine that the error frame was validly generated and/or that there was a possibility that the error frame was validly generated. It will be appreciated that it may be determined that it was validly generated from the point of view of the CAN controller.

Thus, without the metadata, the apparatus 210 may have determined that the error frame was invalidly generated in this second case and may have taken a control action against the CAN controller 200 to restrict its transmissions or to silence it. However, by use of the metadata, such action may not be taken or different action may be taken.

In summary, the apparatus 210 may determine whether or not the transmit-data is compliant with one or more rules based on the respective values of each of the one or more bits and the metadata using any desired algorithm.

However, the metadata provides additional information to avoid mis-categorising the transmit-data. Thus, determination of the transmit-data being non-compliant with the one or more rules is less likely when the metadata is indicative of the occurrence of an edge in the edge detector window for one or more recent bits of the one or more bits than when the metadata is indicative of the non-occurrence of an edge in the edge detector window for the one or more recent bits of the one or more bits. It will be appreciated that the metadata for several recent bits may be required before a decision of non-compliance can be determined.

The detection of edges could also be used to detect tampering on the bus or other diagnostic functions. In one or more examples, the apparatus may be configured to, using the metadata and one or more predetermined rules, identify one or more nodes that are coupled to the CAN bus that are generated edges at times where it is not expected. The apparatus may then be able to send one or more signals to take action against those one or more nodes.

Figure 6:
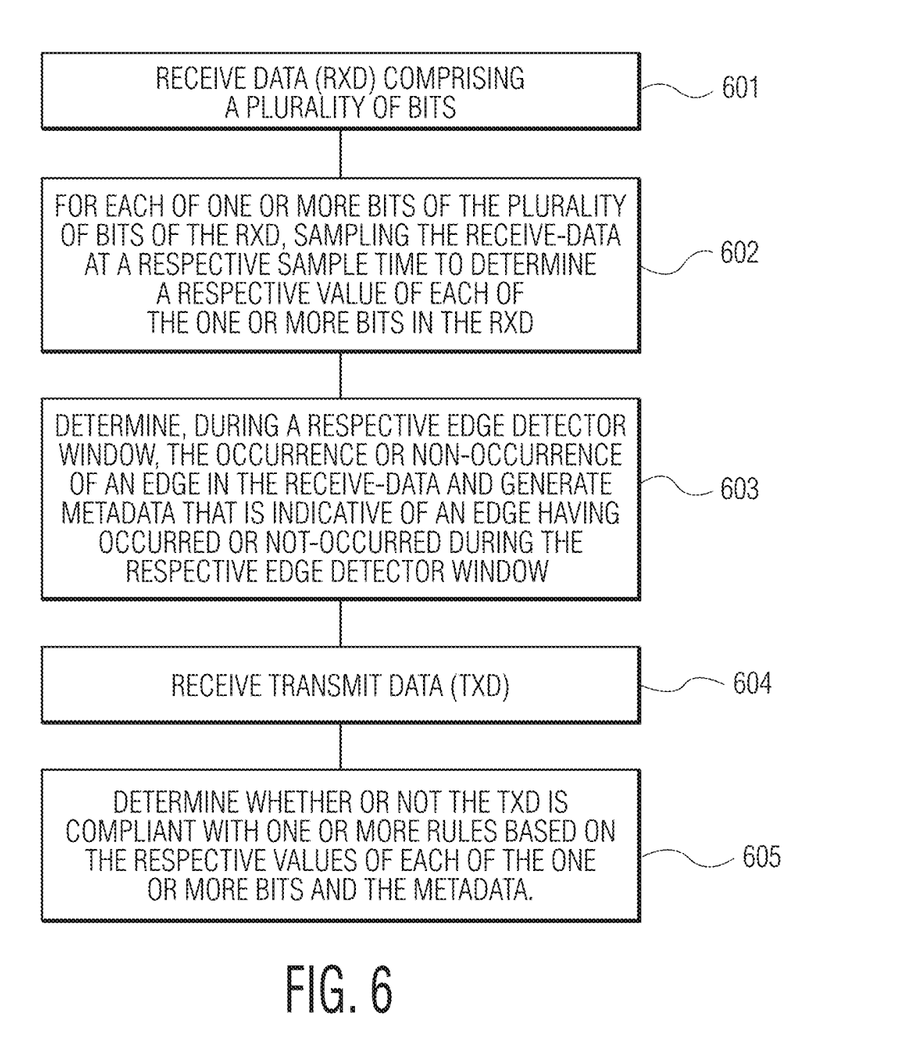
FIG. 6 show an example flowchart illustrating a method performed by the apparatus.

FIG. 6 illustrates an example method for a CAN transceiver, the CAN transceiver configured to couple to a CAN bus and generate receive-data based on one or more signals received from the CAN bus and generate one or more signal on the bus in response to transmit-data received from a CAN controller, wherein the method comprises:

receiving 601 the receive-data, the receive-data comprising a plurality of bits; and for each of one or more bits of the plurality of bits of the receive-data, sampling 602 the receive-data at a respective sample time to determine a respective value of each of the one or more bits in the receive-data; and determining 603 by an edge detector, during a respective edge detector window, the occurrence or non-occurrence of an edge in the receive-data and generate metadata that is indicative of an edge having occurred or not-occurred during the respective edge detector window and wherein the edge detector window comprises a period of time, in each of the one or more of the plurality of bits, that extends from a first time to a second time and that includes the sample time;

receiving 604 the transmit-data; and determining 605 whether or not the transmit-data is compliant with one or more rules based on the respective values of each of the one or more bits and the metadata.

Figure 7:
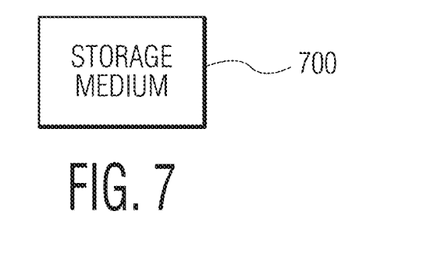
FIG. 7 shows an example computer readable medium.

FIG. 7 shows a non-transitory computer readable medium comprising computer program code which is configured to cause a processor and a memory to perform the method of FIG. 6.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. An apparatus for a controller area network (CAN) transceiver, the CAN transceiver configured to couple to a CAN bus and generate receive-data based on one or more signals received from the CAN bus and configured to generate one or more signals on the CAN bus in response to transmit-data received from a CAN controller, wherein the apparatus comprises control circuitry configured to:

receive the receive-data, the receive-data comprising a plurality of bits; and for each of one or more bits of the plurality of bits of the receive-data, sample the receive-data at a respective sample time to determine a respective value of each of the one or more bits in the receive-data;

wherein the control circuitry comprises an edge detector configured to:

determine, during a respective edge detector window for each bit of the receive-data, the occurrence or non-occurrence of an edge in the receive-data; and generate metadata that is indicative of an edge having occurred or not-occurred during the respective edge detector window;

wherein the respective edge detector window comprises a period of time, in each of the one or more bits of the plurality of bits, that extends from a first time to a second time and that includes the respective sample time; and wherein the control circuitry is further configured to:
receive the transmit-data; and
determine whether or not the transmit-data is compliant with one or more rules based on the respective values of each of the one or more bits and the metadata.

2. The apparatus of claim 1, wherein the period of time that defines the respective edge detector window is predetermined.

3. The apparatus of claim 1, wherein the period of time that defines the respective edge detector window is configured to end prior to an end of the respective bit of the one or more bits.

4. The apparatus of claim 1, wherein the apparatus is provided as part of the CAN transceiver for coupling with the CAN controller.

5. The apparatus of claim 4, wherein the first time and the second time that define the period of time of the respective edge detector window is based on a clock drift parameter, the clock drift parameter defining the accuracy of a clock of one or more of the CAN controller and the apparatus.

6. The apparatus of claim 1, wherein the period of time that defines the respective edge detector window is variable and dependent on a position in a CAN frame in the receive-data.

7. The apparatus of claim 1, wherein the first time is prior to the respective sample time and the second time is after the respective sample time.

8. The apparatus of claim 1, wherein based on a determination that the transmit-data is not compliant, the apparatus is configured to prevent transmission by the CAN transceiver of the transmit-data by:
modification of the transmit-data;
blocking of the transmit-data from receipt by a transmitter module of the CAN transceiver, the transmitter module configured to translate the transmit-data into differential voltage levels for transmission on the CAN bus; or
blocking of the output of the transmitter module of the CAN transceiver, the transmitter module configured to translate the transmit-data into differential voltage levels and output said differential voltage levels to the CAN bus.

9. The apparatus of claim 1, wherein said apparatus is configured to detect errors in the receive-data, and wherein said one or more rules include the detection of an error frame in the transmit-data only at times that correspond to when the apparatus detects an error is present in the receive-data.

10. The apparatus of claim 9, wherein the control circuitry is further configured to determine that the error is present in the receive-data if any of the following receive-data rules is contravened:
a stuff error rule, the stuff error rule defining adherence to a bit stuffing rule of a CAN protocol;
a cyclic redundancy check (CRC) error rule, the CRC error rule defining that a CRC field indicates that data in a data field is correct;
a form error rule, the form error rule defining one or more expected values of predetermined bits in a CAN frame according to the CAN protocol; or
a bit error rule, the bit error rule defining that bits in the transmit-data should be seen in the receive-data.

11. The apparatus of claim 9, wherein the apparatus is configured to determine that the error frame was validly generated based on:
detection of an error frame, in the transmit-data, sent by the CAN controller;
determination that an error has occurred in the receive-data; and
the metadata does not indicate the occurrence of an edge associated with said one or more bits.

12. The apparatus of claim 9, wherein the apparatus is configured to determine that the error frame was validly generated based on:
detection of an error frame, in the transmit-data, sent by the CAN controller;
determination that an error has not occurred in the receive-data; and
the metadata does indicate the occurrence of one or more edges associated with the one or more bits.

13. The apparatus of claim 1, wherein the apparatus is configured such that the determination of the transmit-data being non-compliant with the one or more rules is less likely when the metadata is indicative of the occurrence of an edge in the respective edge detector window for one or more recent bits of the one or more bits than when the metadata is indicative of the non-occurrence of an edge in the respective edge detector window for the one or more recent bits of the one or more bits.

14. The apparatus of claim 1, wherein the apparatus is configured to modify the receive-data that is to be sent to the CAN controller, wherein the apparatus is configured to latch the value of a respective bit, as represented in the receive-data, during the respective edge detector window, such that the value of the respective bit is held constant during the respective edge detector window.

15. A method for a controller area network (CAN) transceiver, the CAN transceiver configured to couple to a CAN bus and generate receive-data based on one or more signals received from the CAN bus and configured to generate one or more signals on the CAN bus in response to transmit-data received from a CAN controller, wherein the method comprises:
receiving the receive-data, the receive-data comprising a plurality of bits;
for each of one or more bits of the plurality of bits of the receive-data, sampling the receive-data at a respective sample time to determine a respective value of each of the one or more bits in the receive-data;
determining by an edge detector, during a respective edge detector window for each bit of the receive-data, the occurrence or non-occurrence of an edge in the receive-data and generate metadata that is indicative of an edge having occurred or not-occurred during the respective edge detector window and wherein the respective edge detector window comprises a period of time, in each of the one or more bits of the plurality of bits, that extends from a first time to a second time and that includes the respective sample time;
receiving the transmit-data; and
determining whether or not the transmit-data is compliant with one or more rules based on the respective values of each of the one or more bits and the metadata.

16. The method of claim 15, wherein the period of time that defines the respective edge detector window is predetermined.

17. The method of claim 15, wherein the period of time that defines the respective edge detector window is configured to end prior to an end of the respective bit of the one or more bits.

18. The method of claim 15, wherein the method further comprises varying the period of time that defines the respective edge detector window dependent on a position in a CAN frame in the receive-data.

19. The method of claim 15, wherein said method further comprises detecting errors in the receive-data, and wherein said one or more rules include the detecting of an error frame in the transmit-data only at times that correspond to when an error is present in the receive-data.

* * * * *